(12) United States Patent
Kolber

(10) Patent No.: US 6,190,566 B1
(45) Date of Patent: Feb. 20, 2001

(54) TREATMENT OF WASTE PRODUCED BY FARM ANIMALS RAISED UNDER CONFINED CONDITIONS

(75) Inventor: Steven N. Kolber, 313-C Glen Echo La., Cary, NC (US) 27511

(73) Assignee: Steven N. Kolber, Cary, NC (US)

( * ) Notice: Under 35 U.S.C. 154(b), the term of this patent shall be extended for 0 days.

(21) Appl. No.: 09/103,305

(22) Filed: Jun. 23, 1998

(51) Int. Cl.$^7$ .................. C02F 1/04; C02F 11/12
(52) U.S. Cl. .................. 210/744; 210/747; 210/769; 210/805; 119/447; 119/450
(58) Field of Search .................. 210/609, 744, 210/760, 768, 769, 770, 805, 783, 400, 800, 804, 532.1, 532.2, 747; 119/450, 451, 447

(56) References Cited

U.S. PATENT DOCUMENTS

| | | |
|---|---|---|
| 1,874,972 | 8/1932 | Hall . |
| 3,361,259 | 1/1968 | Von der Gathen et al. . |
| 3,549,011 | 12/1970 | Marsh . |
| 3,625,883 | 12/1971 | Valdespino . |
| 3,855,118 | 12/1974 | Mikolajczyk . |
| 3,938,449 | 2/1976 | Frisz et al. . |
| 3,956,126 | 5/1976 | Streebin et al. . |
| 3,975,272 | 8/1976 | Bole . |
| 3,979,289 | 9/1976 | Bykowski et al. . |
| 4,053,399 * | 10/1977 | Donnelly et al. .................. 210/151 |
| 4,121,524 | 10/1978 | Voelskow et al. . |
| 4,169,791 * | 10/1979 | Johnson, Jr. et al. ............ 210/170 |
| 4,193,206 | 3/1980 | Maffet . |
| 4,211,162 | 7/1980 | Bastgen . |
| 4,298,473 | 11/1981 | Wyman . |
| 4,306,975 | 12/1981 | Siewert . |
| 4,321,150 | 3/1982 | McMullen . |
| 4,321,151 | 3/1982 | McMullen . |
| 4,368,125 | 1/1983 | Murray . |
| 4,429,643 * | 2/1984 | Mulholland .................. 110/238 |
| 4,687,584 | 8/1987 | Urbani . |
| 4,818,405 * | 4/1989 | Vroom et al. .................. 210/770 |
| 4,872,998 | 10/1989 | Dausman et al. .............. 210/710 |
| 4,963,270 | 10/1990 | Turkia et al. . |
| 5,078,882 | 1/1992 | Northrop . |
| 5,372,077 | 12/1994 | Yen et al. . |
| 5,389,166 * | 2/1995 | White .................. 210/807 |
| 5,472,472 | 12/1995 | Northrop . |
| 5,538,529 | 7/1996 | Northrop . |
| 5,556,232 | 9/1996 | Malmgren . |
| 5,562,832 | 10/1996 | McOnie et al. . |
| 5,626,644 | 5/1997 | Northrop . |
| 5,817,241 | 10/1998 | Brayboy . |
| 5,890,454 * | 4/1999 | Moore, Jr. .................. 119/450 |
| 6,039,874 * | 3/2000 | Teran et al. .................. 210/605 |

* cited by examiner

Primary Examiner—Robert J. Popovics
(74) Attorney, Agent, or Firm—Myers Bigel Sibley & Sajovec, P.A.

(57) ABSTRACT

Noxious odors and water pollution commonly associated with the raising of hogs, cattle or poultry under confined conditions are eliminated by replacing the conventional waste lagoon and waste spreading fields with a wastewater treatment plant. The treatment plant extracts manure from the wastewater, then dries and burns the manure along with collected waste gases. The liquid waste portion is filtered, deodorized and then recirculated to the growing buildings as flushwater.

20 Claims, 13 Drawing Sheets

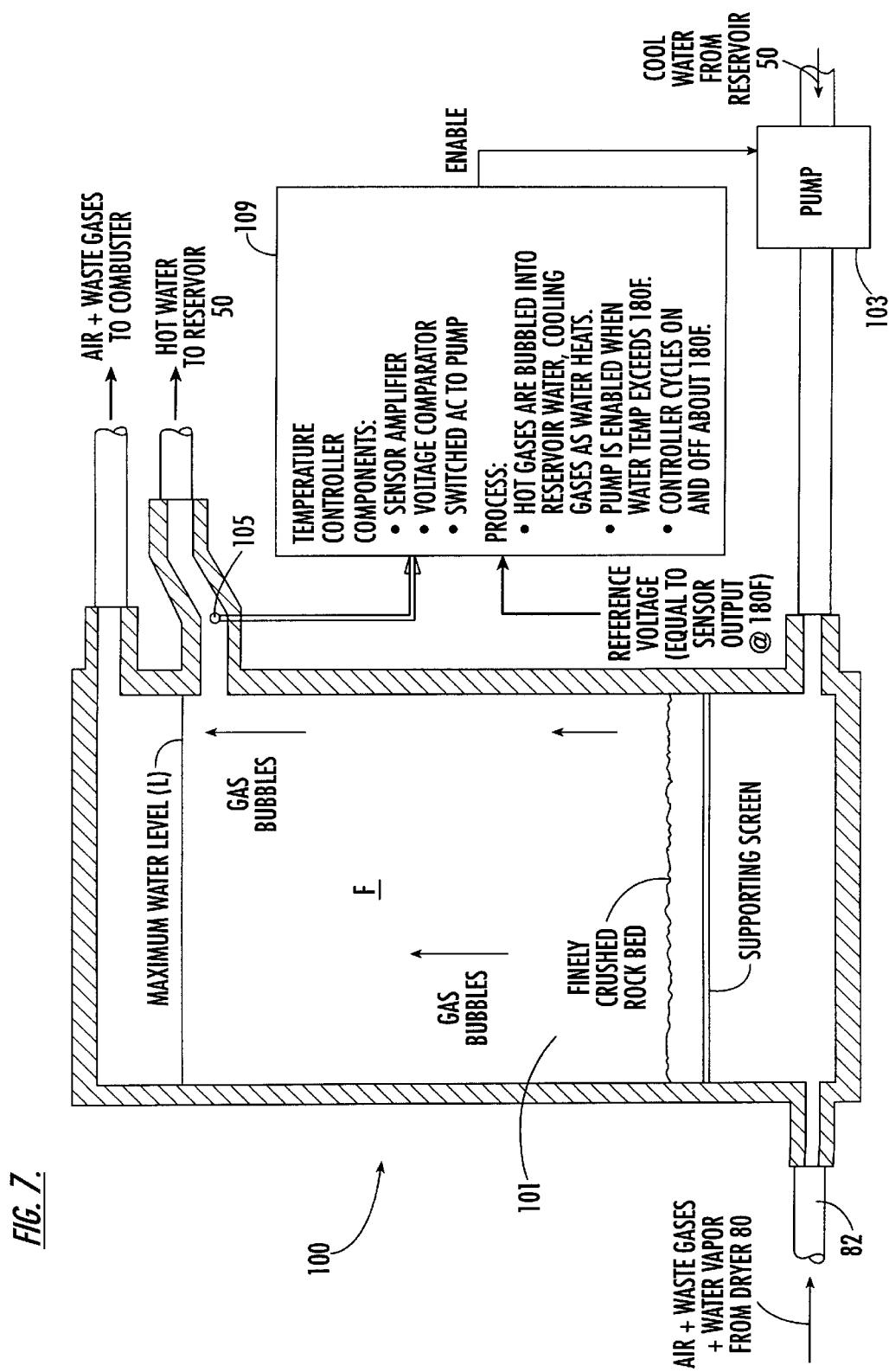

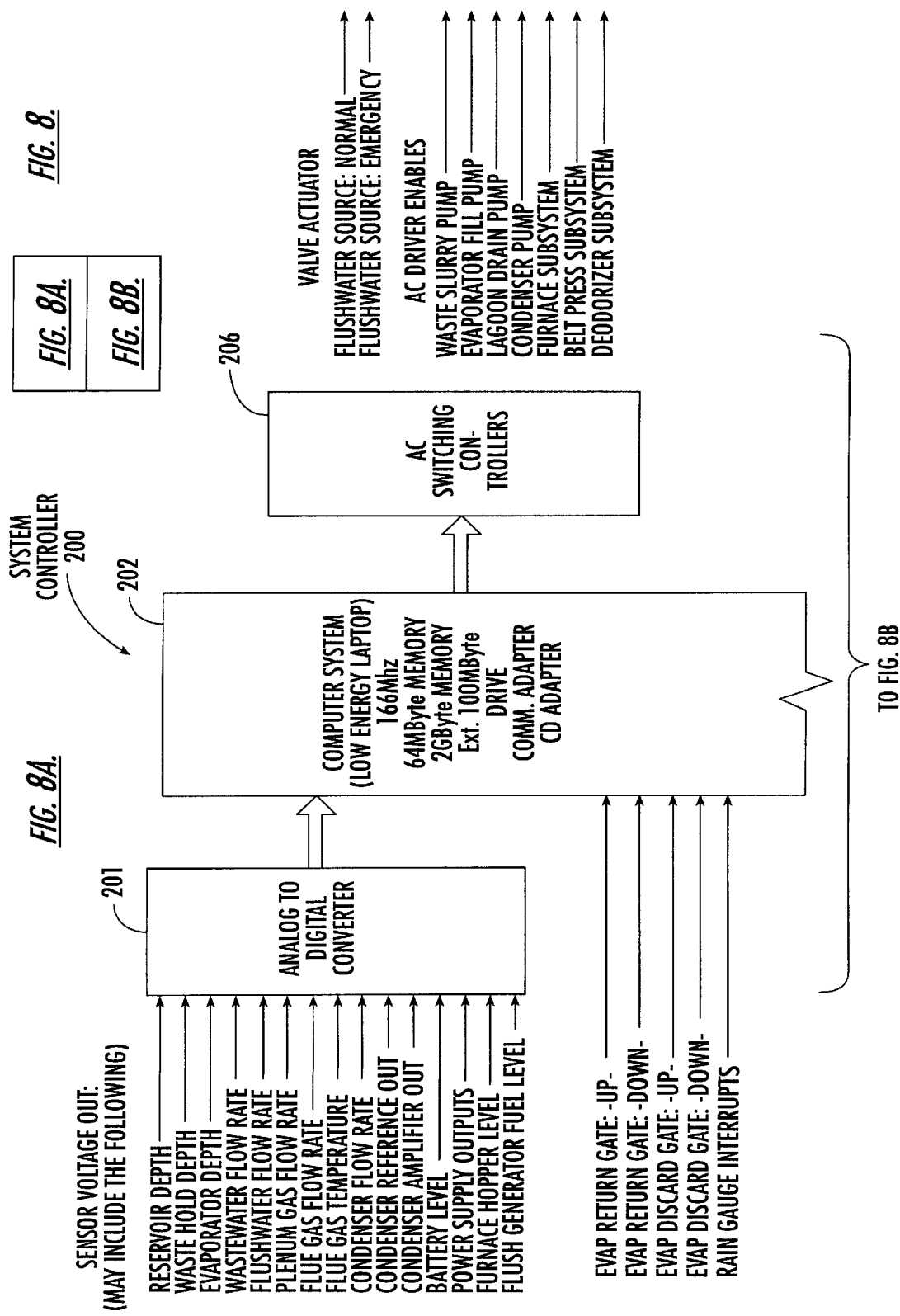

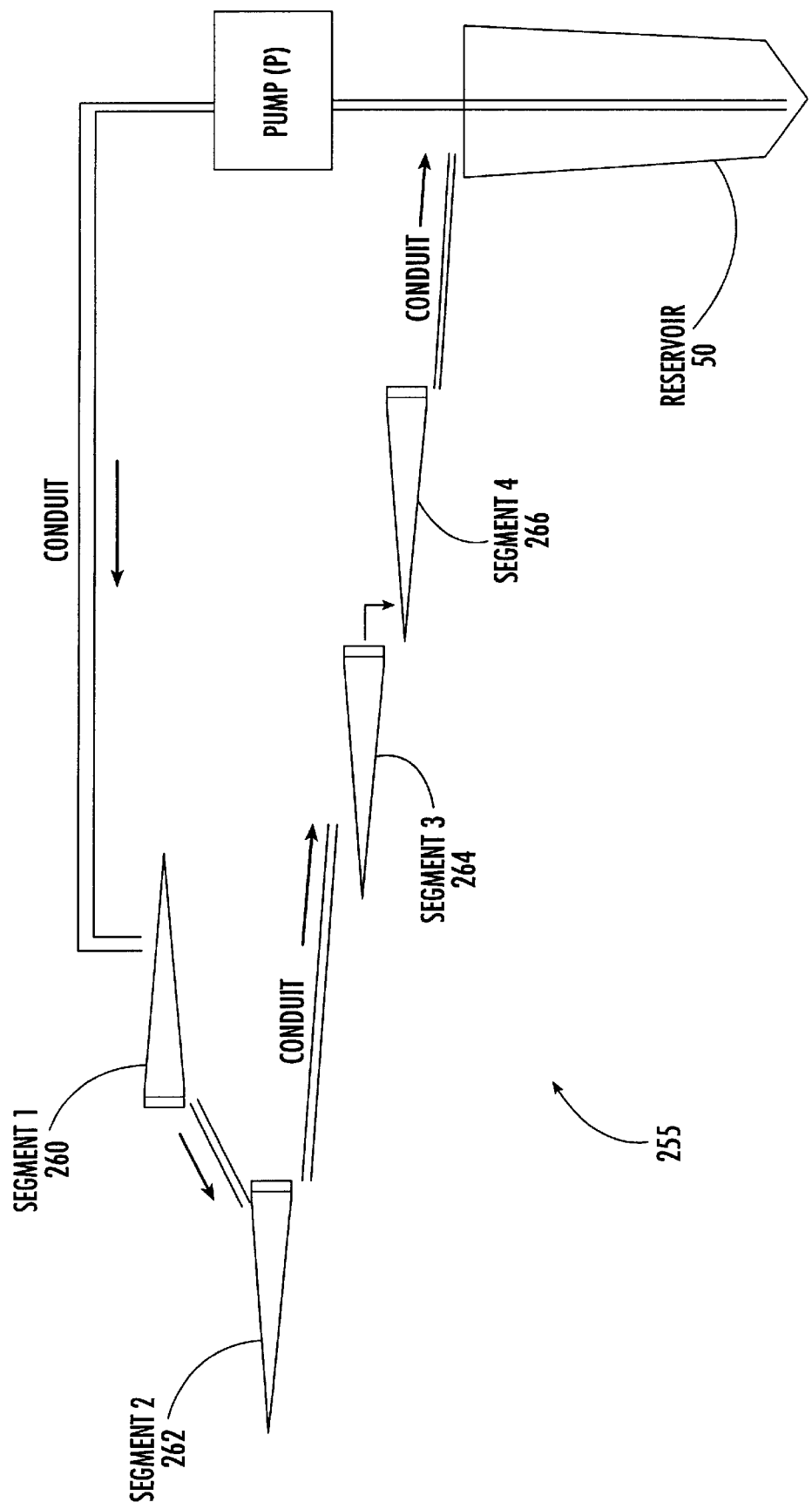

TREATMENT OF WASTE PRODUCED BY FARM ANIMALS RAISED UNDER CONFINED CONDITIONS

FIELD OF THE INVENTION

The invention relates to the raising of farm animals, such as hogs, cattle and poultry, under confined conditions (e.g. in a growing building or feedlot). More particularly, the invention relates to either a new construction or retrofit system that processes the wastewater that is used to flush animal waste from the confined growing area. The process serves to extract manure from the wastewater and dispose of the manure in an environmentally responsible manner.

DESCRIPTION OF THE PRIOR ART

The confinement of farm animals according to modern agricultural techniques has produced immense environmental problems associated with waste disposal. These problems have been encountered in hog farming, feedlot cattle farming and poultry farming.

The United States Environmental Protection Agency has estimated that there are 450,000 farming operations in the United States that confine animals and of these approximately 6,600 are big enough to raise over 2,500 hogs or over 1,000 cattle or 30,000 chickens. But many farms raise far more. The EPA estimates that two thirds of the 6,600 farms do not have pollution discharge permits, and most of the existing permits are inadequate to control water pollution from the spreading of manure on land. Land spreading has always been the primary means of hog waste disposal.

Farmers, academicians, businesses and governments have devised solutions for various aspects of the animal waste situation, but these solutions are generally costly or awkward. Thus far, all efforts have yielded partial solutions, at best. Where previously the animal waste might have been sold to crop farmers for its nutrient value, the development of convenient chemical fertilizers has largely eradicated the market for cumbersome, odorous manure. Furthermore, any process that addresses environmental problems while adding significantly to farm expenses is objectionable in the extremely competitive animal growth industry.

While the problems addressed by the present invention apply to various types of animals grown in confined areas, the example of hogs raised in growing buildings is illustrative, and this type of animal farming operation will be described herein in detail, both in connection with the background of the invention and specific embodiments that illustrate details of the invention. More particularly, the present invention will be described herein in various respects with reference to the hog industry as it exists in the State of North Carolina, USA, the second largest hog producing state in the United States.

Hog farming in North Carolina has enjoyed, and suffered from, an explosive growth rate. The industry more than tripled in the period from 1990 to 1995, with over 12 million hogs marketed in 1995. Much of that production is exported to other states and other countries. Competitive pricing and increased volumes have driven a rapid trend to economize through large scale operations. Recent startups in North Carolina exceed 5000 hogs per farm, with high-tech automated factory farms processing 50,000 hogs or more.

Of course, an undesirable consequence of so many hogs is so much hog waste. North Carolina's 1995 hog crop produced as much raw waste as a country of 30 million people. While waste concentration has increased almost a hundred-fold since 1980, the waste disposal processes have remained unchanged.

Illustrative Hog Farming Operation (Prior Art)

A large scale hog farm operation incorporating prior art techniques will now be described with reference to FIG. 1. Hogs are typically raised on grates (not shown) in close confinement growing buildings 10 from the time they are born to the time they are marketed. The hogs' manure and urine fall into troughs beneath the grates. Flush pumps 14 draw settled flushwater from a waste storage lagoon 18 to fill tanks 22 for flushing each building.

Waste accumulated in the buildings' under-floor troughs is then flushed back to the lagoon, which provides temporary storage for the wastewater until the proper conditions occur for permanent waste disposal on the spreading fields, discussed below.

Manure waste within the wastewater settles and decomposes in the lagoon. This process reduces the solid waste mass to sludge, producing extremely odorous gases which are released if the lagoon water is disturbed by excessive wind, heat, or heavy wastewater discharges. Although the lagoon's wastewater must be emptied periodically, farmers rarely remove the settled sludge. As a result, the lagoon bottom continuously rises until, after several years, the depth becomes insufficient to maintain the decomposition process. The farmer must then build another lagoon.

The lagoon's wastewater rises due to accumulation of waste plus the amount by which rainfall exceeds evaporation. To prevent overflow, the lagoon level must be reduced periodically by spreading its wastewater contents over adjacent spreading fields 24. A typical lagoon for a 10,000 hog farm would occupy approximately six acres.

Spreading fields 24 are owned and operated by the farmer for the sole purpose of absorbing the high nutrient, bacteria laden wastewater. It is essential that the fields be planted with crops capable of completely absorbing the waste nutrients so that they do not leach through the soil to contaminate aquifers and waterways.

Effective disposal of hog waste by field spreading is dependent on the volume of waste, size of the field, type of crop and crop condition, plus care given to the spreading operation. On average, more than half of the total farm area is dedicated to the waste disposal spreading fields.

Animal waste odors cause greater distress than other forms of pollution. Farm neighbors are angered and depressed by overpowering odors and loss of property values. The primary cause of the irritating odors is the bacterial decomposition of waste beneath the lagoon's surface in the absence of oxygen. This anaerobic decomposition process releases many noxious gases, among which are ammonia, methane and volatile fatty acids. Of these, fatty acids produce the most distressing odors. Ammonia is a major contributor to acid rain, and methane contributes to global warming. These gases are released when the water becomes very warm or disturbed by winds, or by excessive waste discharges into the lagoon. Therefore, it is not surprising that the hog farm's most objectionable odors occur during emptying of the lagoon liquid onto the spreading fields. Despite the many environmental problems, anaerobic lagoons are inexpensive to operate and are therefore the most commonly used lagoons for livestock manure.

A costly alternative to the anaerobic decomposition process is achieved by aerating the lagoon. While aerobic lagoons reduce odors, ammonia is produced. Aerobic bacteria require a constant supply of oxygen which is achieved by pumping large volumes of air into the manure-water mixture. In addition, the aerobic process is dependent on sunlight. Due to the high expense of continuous oxygenation and the large surface area required, aerobic lagoons are considered impractical for most animal waste operations.

North Carolina's environmental regulations on lagoon construction, which are illustrative of those of other states, have not kept pace with the growing problems. It was generally believed that the lagoons are self-sealing; that is, sludge deposits will cover the bottom of a lagoon within months preventing escape of harmful bacteria and chemicals to the groundwater. However, recent studies show that large numbers of lagoons are leaking, some of them severely. Researchers have found that lagoons built on permeable soil may never seal adequately, and that clay based lagoons may leak after periods of hot dry weather followed by sudden rainfall. Leakproof lagoons may be built using synthetic liners or compacted bentonite clay, but sealing lagoons in this manner is costly; therefore, to date, few lagoons have been built with protective liners.

Several major lagoon breaks occurred in recent years. In one instance, a 7.5 acre lagoon on a 10,000 hog farm spilled 25 million gallons of raw sewage into an adjacent river. The resulting overload of nitrates resulted in a massive fish kill which spread over many miles. Also found after the spill were high levels of fecal coliform bacteria, known to cause potentially fatal enteric disorders to humans, such as salmonella and the *E-coli* virus.

Possible consequences of existing animal waste disposal practices are outbreaks of Pfiesteria, a toxic organism found in rivers overloaded with nutrient pollution from hog or chicken farm runoff. Pfiesteria is suspected of killing billions of fish from Delaware to Alabama since it was identified in 1991. It is also believed to injure humans who come in contact with the infested waters or breathe its airborne toxins.

Frequent severe problems arise under the prior waste management processes. Waste is often spread on inadequate or barren fields, or in many instances it is deliberately discarded raw into streams or marshes. Historically, lagoon construction was so poor that leaks and breaks were common. With current stricter and more costly construction regulations, the farmer is tempted to shortcut the quality of the installation.

Even with the currently heightened awareness of environmental dangers, North Carolina regulatory authorities are unable to do more than occasional inspections.

Responding to the public outcry over odors, in 1995 the North Carolina legislature imposed setback regulations requiring that new hog farms be built no closer than 1500 feet from neighboring homes. For a farm of 10,000 hogs, the growing area occupies approximately one hundred acres. This includes the growing buildings, feed silos, roads, loading ramps, equipment storage, etc. The lagoons and spreading fields can occupy from one hundred to two hundred more acres. Added to all this, the extensive buffer areas required by the setback legislation combine to make it almost impossible to find available land parcels large enough for hog farming, as well as to make the cost of new farms almost prohibitive. In 1997 the legislature responded to vehement protests that the setbacks were ineffective by imposing a two year moratorium on growth of large scale hog farming in the state. No new or expanded operations would be permitted unless new processes or new technologies were employed to appreciably reduce odors. In passing the moratorium, the legislature implored universities and industry to resolve the situation by the spring of 1999.

Municipal wastewater treatment technology has been considered as an option for addressing the problems above, however, this process would be too costly and far too risky for general use in animal waste disposal. Primary treatment is the removal of settleable waste solids, resulting in great quantities of wet sludge which must then be trucked away for landfill. Secondary treatment is the reduction of the wastewater nutrients by biological digestion of the organic matter. This process depends on careful maintenance of a healthy culture of microorganisms which feed on the sewage. This requires the frequent attention of a skilled operator, as even a slight disturbance to the waste stream can cause the bacterial colony to sicken or die. At that point, raw sewage will pass directly through the system and discharge to the public waterways.

Another approach for dealing with the above described environmental problems is set forth in U.S. Pat. Nos. 5,078,882 and 5,538,529, which describe a method of treating the wastewater aerobically and anaerobically to produce a beneficial humus material. However, while the approach presented in these patents may reduce farm odors, several other problems may be created. The sludge sediment of a conventional anaerobic lagoon may be allowed to build up over several years, as the lagoon is usually large enough and deep enough to contain the accumulation. However, the sediment of this process builds up quickly in the small lagoon, and could shut down the disposal process altogether if not removed on a timely basis. The farmer would have to be assured of a regular sediment collection and disposal process. A pair of lagoons are provided to facilitate sediment removal, with one remaining in service while the other is being dredged. As with other aerobic digesters, this process requires continuous, energy-intensive oxygenation. The process also requires that a wetlands area be built and maintained. In addition to the lagoons, field spreading would continue, though on a somewhat reduced scale. Ammonia production would continue unabated. Also, this process provides no capability for draining a discontinued lagoon.

Accordingly, there is an acute need for an animal farm wastewater treatment system that is respectful of the environment, particularly in connection with reductions in air and water pollution by replacing the dirty disposal practices of lagooning and field spreading. Most preferably, such a system should reduce the farm area requirement to one half or less of that currently required by eliminating the lagoons and spreading fields and replacing the same with a self-contained disposal system.

SUMMARY OF THE INVENTION

The present invention provides an economically feasible system for substantial reduction or elimination of environmental problems resulting from confinement growth of farm animals, while achieving a significant reduction in land required to grow the animals. More particularly, the present invention eliminates the disposal practices of lagooning and field spreading and replaces these practices with an enclosed, real-time waste processor, which substantially destroys all waste within hours. Therefore, lagoon retention is not required, nor is batch disposal by field spreading required. Energy derived from the normally discarded manure waste is utilized to burn all solid and gaseous waste components, as well as to assist in the evaporation of excess wastewater. A process of managed solar evaporation provides additional low cost means for disposal of excess wastewater. The remaining wastewater is filtered and deodorized before being recycled for use as flushwater. The present invention does not produce ammonia and methane gases, deleterious byproducts of prior processes. The present invention is suitable for new farm construction or, in the alternative, may be used as a retrofit to an existing farm operation having lagoons and spreading fields. With respect to retrofit operations, once the system of the present invention has been installed, the farmer is free to sell the discontinued spreading fields or use that land to expand his animal growing business.

In one broad aspect, the present invention may be described as a method of processing animal wastes produced in the confined animal growing area of a farm. This method begins by establishing a wastewater stream of flushwater and waste from the growing area. The manure is separated from the wastewater stream into a wet manure portion and a liquid portion. The wet manure portion is dewatered, followed by burning the dewatered manure. The liquid portion is cleansed and recirculated to the confined animal growing area as flushwater. According to this method, the separating step may be carried out by screening the wastewater to produce a first amount of wet manure followed by settling solids from the remainder of the wastewater to produce a second amount of wet manure. Furthermore, waste gases produced during the separating and dewatering steps may be collected and burned.

In another aspect, the present invention may be defined as a wastewater treatment plant that includes a separator for receiving the wastewater stream and dividing the wastewater into a wet manure portion and a liquid portion. A dryer is in communication with the separator for receiving the wet manure therefrom and drying the same to an acceptable moisture content for burning. A combustor is in communication with the dryer for receiving manure therefrom and burning the same. Appropriate means is provided for recirculating the liquid portion from the separator to the confined animal growing area for use as flushwater. The wastewater treatment plant preferably includes means, e.g. ozonation means, for cleansing the liquid portion prior to recirculating the liquid for use as flushwater. The plant also preferably includes a flushwater reservoir for receiving and holding the liquid portion from the separator prior to recirculating the liquid as flushwater, and a solar evaporator having a basin for receiving flushwater from the flushwater reservoir to permit evaporation of a portion of the flushwater in order to counter water accumulation in the flushwater loop.

In yet another aspect, the present invention may be described as a method for converting an existing hog farm of the type having a confined area for growth of hogs, a lagoon and spreading fields to an environmentally sound operation requiring less acreage. This method includes installing a wastewater treatment plant at an existing hog farm and operating the plant according to the method described above. Additionally, the contents of the discontinued lagoon is drained through the wastewater treatment plant at times when excess plant capacity so permits. This enables the farmer to discontinue use of the spreading fields for the receipt of lagoon water so that the spreading fields acreage may be used to expand hog farming operations, used as conventional crop fields, sold to finance the installation of the wastewater treatment plant, or otherwise used as desired by the farmer without the necessity of spreading lagoon water thereon.

BRIEF DESCRIPTION OF THE DRAWINGS

Some of the objects having been stated, other objects will appear as the description proceeds, when taken in connection with the accompanying drawings, in which—

FIG. 7 is a view of the gas condenser.

FIGS. 10A and 10B are top and side views, mostly schematic, of an alternative embodiment of the solar evaporator.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
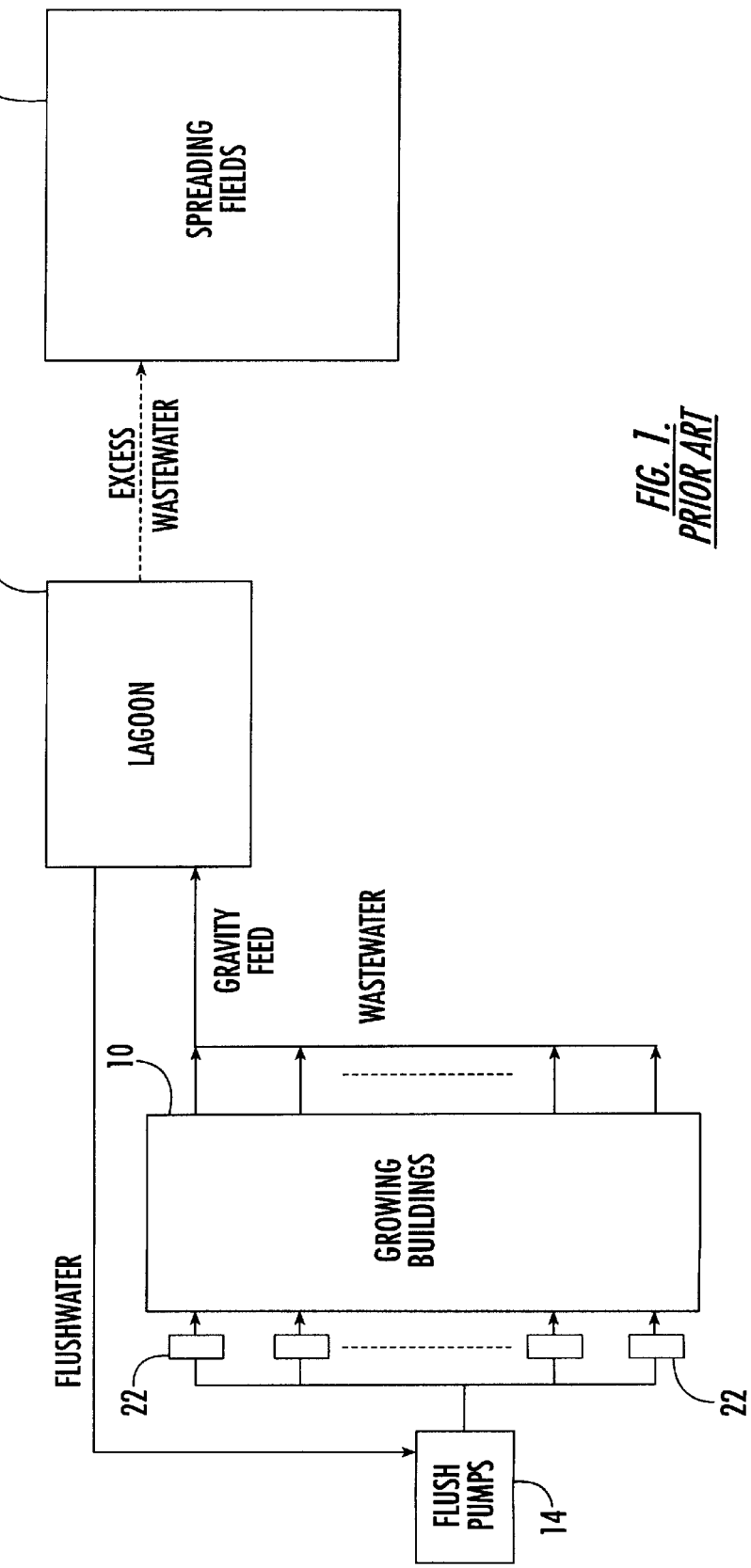
FIG. 1 is a schematic diagram showing the principal components of a hog farm of the prior art.
Figure 2:
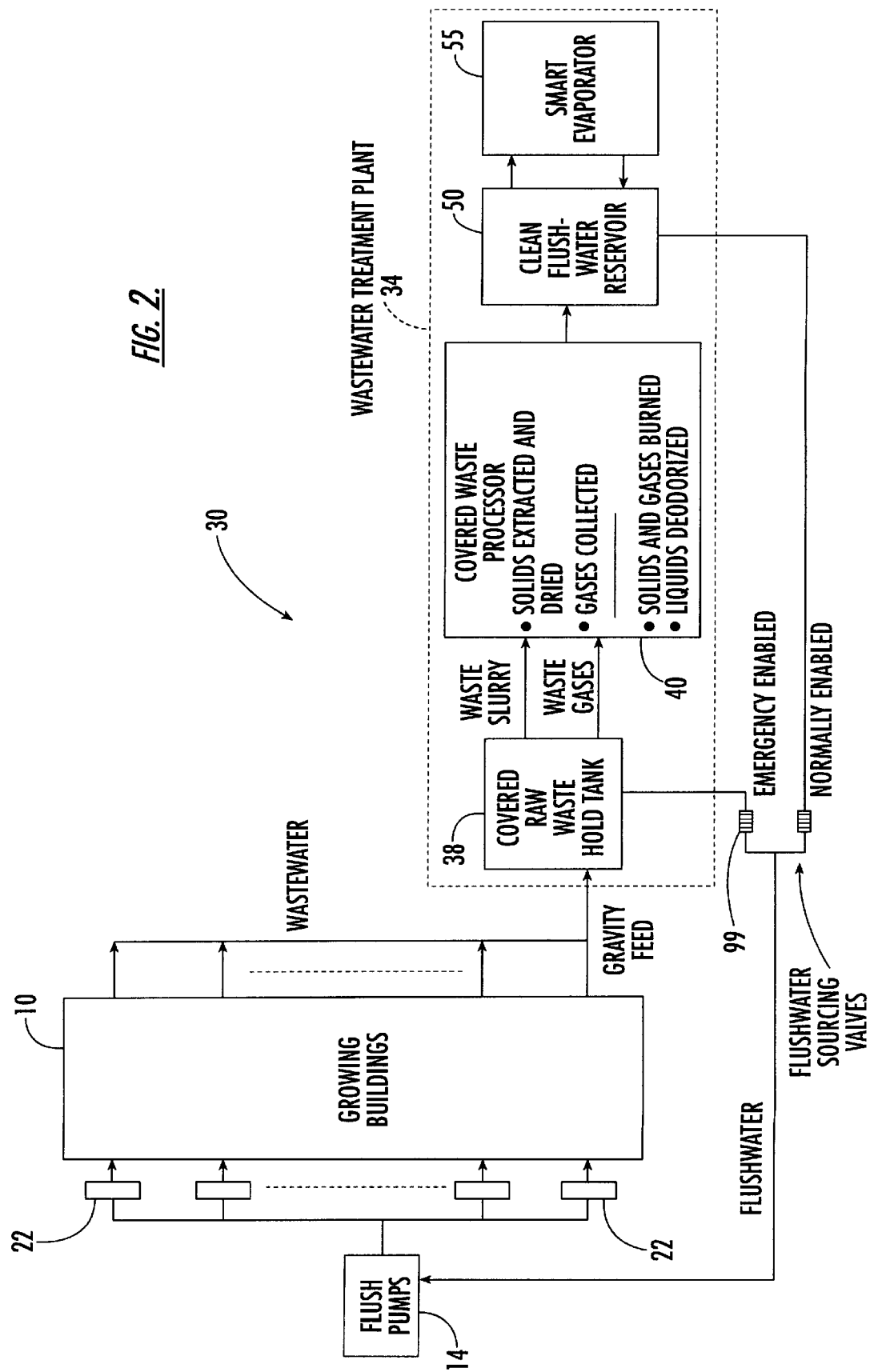
FIG. 2 is a schematic diagram showing a hog farm incorporating the wastewater treatment plant of the present invention.

FIG. 2 schematically illustrates the primary components of an animal growing farm 30 of this invention in which the lagoon and spreading fields have been replaced by a wastewater treatment plant 34. As in the prior art system described above in connection with FIG. 1, manure and urine are periodically flushed from the growing building waste troughs using pumped flushwater. According to the invention, the combined wastes and flushwater are gravity fed to a covered raw waste holding tank 38 which contains the wastewater prior to processing.

Usually waste is removed and processed in "real time", preferably on the same day that it is deposited in the waste holding tank 38. However, waste holding tank 38 preferably has capacity to store the accumulated waste of several days to accommodate those times when the treatment plant is shut down for servicing. Holding tank 38 preferably is covered to contain emitted fumes. Fans (not shown) direct these waste gas fumes to a covered waste processor 40 which is discussed in detail, below. If system power is lost, default vents (not shown) at tank 38, always open, allow the fumes to escape to the atmosphere.

Figure 3:
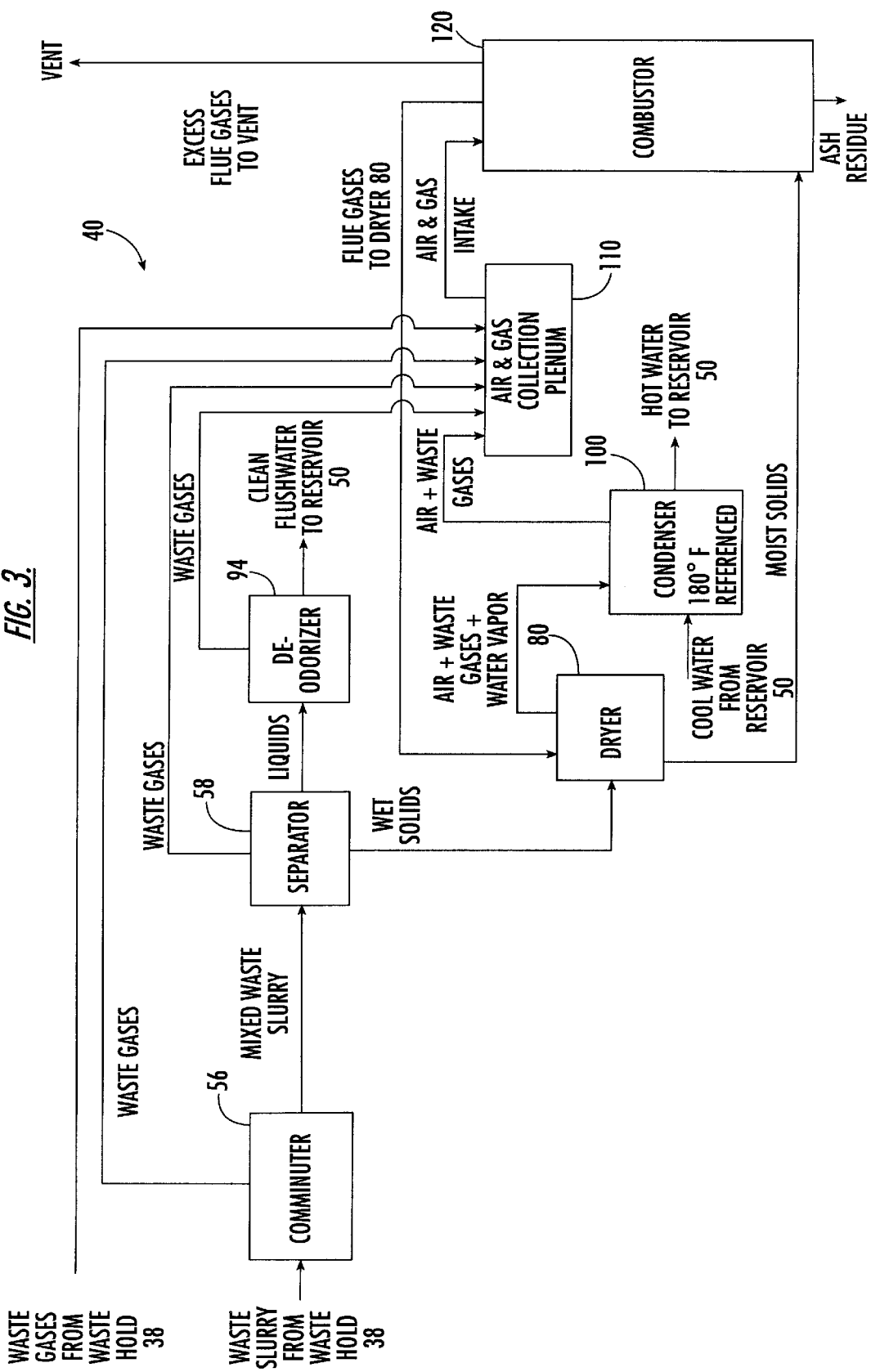
FIG. 3 is a schematic representation of the components of the waste processor that forms a part of the treatment plant of FIG. 2.

A coarse slurry of liquid and solid wastes is drawn from waste holding tank 38 into waste processor 40. Here the coarse waste slurry is mixed to a uniform consistency by a comminuter 56 (FIG. 3). The slurry stream then passes through a separator 58 that separates wet solids from the liquid portion. The wet (manure) solids are then conveyed to a dewaterer or dryer 80 where the wet solids are dewatered to an acceptable moisture content for burning, for example, 40% to 70% water content, using hot flue gases from the incinerator or combustor 120 (described below). The liquid waste, having been cleansed of most solid particles, is then conveyed to a deodorizer 94.

After deodorization, the liquids flow out of processor 40 into a clean flushwater reservoir 50. During normal plant operation, this deodorized flushwater is taken from reservoir 50 as it is produced. The used flushwater, increased by the daily animal waste output, then returns to the treatment plant's wastewater holding tank 38.

A "smart" solar evaporator 55 connected to clean flushwater reservoir 50 prevents buildup of excess flushwater which would otherwise result from accumulated waste plus precipitation. In North Carolina, as in many climates, an exposed body of water would increase in volume over time, as precipitation generally exceeds evaporation. As described in detail below, the "smart" solar evaporator 55 of the present invention incorporates a rain gauge, computer algorithms and evaporator controls which enable it to sense rainfall and to reject it.

By eliminating the lagoon and spreading fields, the wastewater treatment plant of this invention removes the most difficult regulatory requirements. There are no lagoons to leak or break, no field crops to maintain, and no spreading regulations to follow. Under control of the wastewater treatment plant, the entire system complies automatically with environmental regulations.

It will be appreciated that hogs range in size from newborn piglets to mature sows of over 600 pounds. They are generally marketed at a grown out weight of 230–250 pounds, and the 'nominal' average weight for all hogs is given as 135 pounds.

Urine and manure production of the nominal hog is approximately one gallon per day. Where one gallon of hog waste is comprised of approximately 7.3 pounds of waste liquids and one pound of manure. The daily wastewater volume per hog consists of approximately: 1 gal (urine+manure moisture)+1 gal leaked drinking water+8 gal flushwater.

As collected directly from the hog, fresh manure contains approximately 85% liquid and 15% "bone dry" volatile solids. Thus, a farm of 10,000 hogs yields the equivalent of 1,500 pounds of bone dry solids per day. One pound of bone dry solids has a heating value of 7 KBTUs, for a total potential heating value of 10.5 million BTUs per day. This energy will be utilized to destroy the manure and the fumes and to evaporate a significant portion of the excess wastewater. If electricity were used to provide this much energy at a cost of 3 cents per KBTU, it would cost the farmer $115,000 per year. This equates to an unthinkable $5.20 addition to the cost of marketing each hog. Thus, without a plan for manure energy utilization, a cleanup of this magnitude could not be achieved under current hog farm economics.

An example of a wastewater treatment plant sized to handle a farm of 10,000 hogs will now be described in detail with primary reference to FIGS. 3, 4 and 6. As discussed above, FIG. 3 illustrates the major subsystems of the waste processor 40 which converts raw wastewater to clean flushwater while waste solids and gases are burned. The coarse slurry of raw waste is pumped from raw waste holding tank 38 through comminuter 56 which shreds the solids, then mixes them thoroughly with the wastewater. A shredding device used in sewage treatment and deemed suitable for this application is the TM8500 Taskmaster Shredder from Franklin Miller, Inc. of Livingston, N.J.

Figure 6:
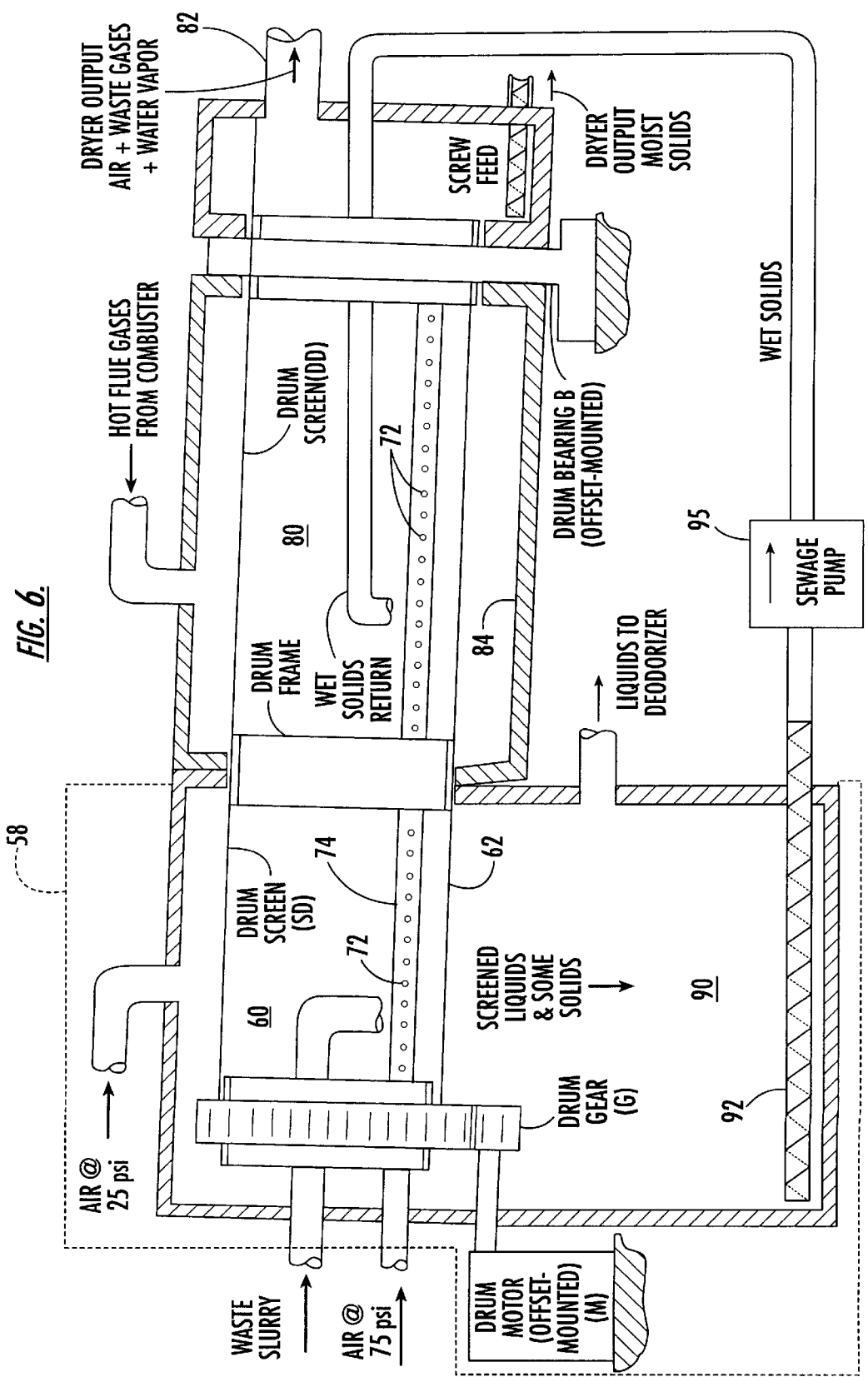
FIG. 6 is a view of a physically integrated two-stage separator and dryer.

FIG. 6 illustrates an integrated embodiment of separator 58 and dryer 80 wherein the separator and dryer are encased in joined housings. Separator 58 includes a primary filter in the form of a rotating screen separator 60 and a secondary filter in the form of a settling tank 90.

Screen separator 60 includes a separator drum SD that is rotated by drum motor M through drum gear G while supported by drum bearing B. A continuous, integrally formed dryer drum DD within dryer 80 receives wet solids from separator drum SD in the manner described below, and rotates with the separator drum. Although shown as sharing a single drum, separator 58 and dryer 80 may utilize different drums, or may take other altogether different forms in which they are independent non-rotational subsystems.

The mixed waste slurry from comminuter 56 is pumped directly onto the separator drum SD. This rotating drum includes a reinforced screen cylinder 62 with a mesh size appropriate for filtering hog waste. A mesh size on the order of 75 microns has been found suitable. The drum has a slight downward pitch which causes the solids thereon to fall forward (to the right in FIG. 6) at every drum rotation. Waste liquids, consisting of urine and flushwater, pass through the screen and fall into settling tank 90 below. Waste solids, the manure, advance along to the end of the separator where they enter dryer 80, with the manure residing on the rotating dryer drum DD.

As received directly from the hog, manure has a natural moisture content of approximately 85%. The agitation and tumbling effect produced in the separator drum drains the free liquid content, leaving the manure at the 85% moisture level.

Drum screen 62 is cleaned, preferably by a continuous process throughout every rotation, by a row of forced air jets 72 which are mounted to a bar 74 adjacent to drum SD and which runs the full length of the drum. In addition to cleaning the screen as it rotates over the air jets, solids within the drum are lifted by the forced air, causing a gentle tumbling action which aids in driving off unbound liquids. This "air scraper" is mounted at a position to promote best tumbling and drainage, such as approximately 30 degrees after the bottom of the drum. The manure solids are subjected to the agitated tumbling effect for several drum rotations, giving adequate opportunity for optimum liquid drainage.

As stated above, the separated wet waste solids from the separation process are dewatered in dryer 80 to reduce the moisture content to an acceptable level prior to incineration. As with the separator, the pitched rotating screen of drying drum DD advances the solids as the drum rotates. As shown in FIG. 6, the cleaning apparatus used with drying drum DD may be the same or similar to the air scraper design used with separation drum SD.

Dryer 80 preferably is surrounded by a high-temperature enclosure 84. Hot flue gases from the combustor, containing no odorous or noxious components, are returned to the dryer where the gases heat the moist manure, driving off water vapor and waste fumes. If manure enters the combustor at 50% moisture content, its combustion would be self supporting, therefore requiring no additional support energy to burn. When the drying process does not achieve 50%, then some support fuel is added to the combustion process. However, as shown immediately below, use of a moderate amount of support fuel has a very slight impact on the cost of taking a hog to market.

If a pound of manure contains 0.85 pounds of bound water and the ideal moisture level for combustion were 50%, then the manure must be dried to a water content of 0.15 pounds. Therefore, 0.70 pounds of moisture must be driven out of each pound of manure which requires 700 BTUs of heat energy. At 0.15 pounds of bone dry solids per pound of manure and 7,000 BTUs per pound of bone dry solids, 1 pound of manure contains 1,050 BTUs of heat energy. For an overall flue gas to dryer-stage heat transfer efficiency of 50%, 1 pound of manure would provide 525 BTUs of drying heat. Propane, the most widely available fuel in agricultural areas, would provide the remaining 175 BTUs. At $0.01 per 1000 BTUs, propane usage would cost $0.00175 per hog, per day. Thus, for an average hog life expectancy of 160 days, the added cost to market would be $0.28.

All waste which passes through drum screen 62 falls into settling tank 90 where a slow non-turbulent flow permits the small waste particles to settle to the tank bottom. According to the manure settling characteristics of animal waste, more than 50% of the manure settles out within the first fifteen minutes. To assure relatively complete settling, a settling interval of one hour preferably is provided; however, shorter or longer intervals may be used. The tapered form of tank 90 permits easy removal of the settled waste solids using a conventional screw feed mechanism 92. The wet solids from tank 90 are then transferred to the dryer drum DD by a sewage pump 95.

After most solids have been removed, the waste liquid is cleansed, preferably in deodorizer 94 where odors are quickly destroyed. In a preferred embodiment, the deodorizer takes the form of an ozonation tank. Ozone provides a reliable, low cost means to oxidize organic compounds. Common applications of ozone include treatment of drinking water, swimming pools and municipal wastewater. It oxidizes minerals, kills bacteria, viruses and algae, and removes unwanted color from the water. In this hog wastewater treatment application, ozone eliminates odors from the liquid waste stream in less than one hour. Following ozonation, the clarified, odorless liquid is suitable for re-use as flushwater and is stored in the clean flushwater reservoir 50. Operating costs of the ozone generation and distribution system over a 10,000 hog farm for the 160 day life of the average hog, the added cost to market would be less than $0.20 per hog. While various forms of ozonation equipment are commercially available, a model no. DO-20 ozonation device manufactured by Finnegan-Reztek Company of Wayne, N.J., USA is deemed satisfactory.

Hot gases expelled in the waste drying process at dryer output 82 are a mixture of noxious fumes and water vapor. In a preferred manner of practicing the invention, the water vapor is extracted so that the fumes may be efficiently burned. A distillation-like process employing cooling, rather than heating, is used to extract the water vapor. To this end, a gas condenser 100 is utilized. Condenser 100 (shown in detail in FIG. 7) includes a heat exchanger 101 in which flushwater F introduced by pump 103 at ambient temperature is used for a cooling source. Condenser 100 is set to operate at 180° through a temperature control system including a temperature sensor 105 and a temperature controller 109 that has a sensor amplifier, voltage comparator and power switching circuit for enabling pump 103. The flushwater flow through the condenser is constantly adjusted to hold the temperature of the condensed water effluent (conduit 111) at 180° F. Waste gases exit the condenser through conduit 115, also at 180° F. While a temperature on the order of 180° F. is believed to be optimal for gas separation, it will be appreciated that this temperature may be adjusted according to heuristic determinations of the system designer.

Waste gases from all sources within the treatment plant 34 are drawn by the combustor intake draft into a common plenum 110. Specifically, fumes from the covered raw waste holding tank 38, comminuter 56, separator 58, deodorizer 94 and gas condenser 100 are drawn into the plenum from which they are drawn into combustor 120 where they are burned along with the dewatered manure solids from dryer 80. The preferred combustor minimizes particulate exhaust by employing a dual burn process wherein gases and particulates produced in the first combustion stage become fuel for the second combustion stage. Such a combustor that is deemed suitable is model no. 1250, manufactured by Decton Iron Works, Inc. of Milwaukee, Wis., USA.

Mass Balance Analysis

Figure 4A:
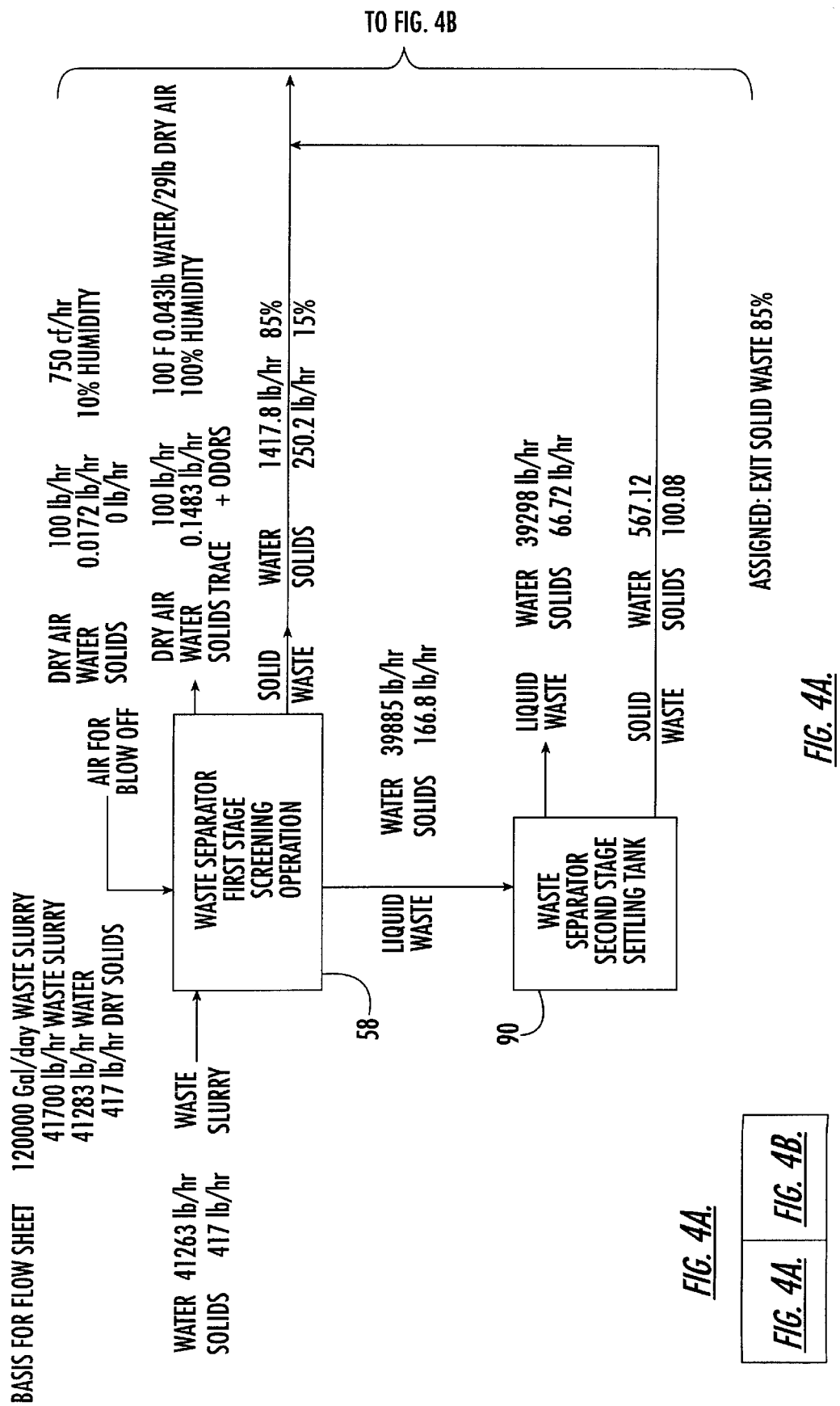
FIG. 4 is a flow chart showing a mass balance analysis for a typical hog farm incorporating the wastewater treatment system of the present invention.
Figure 4B:
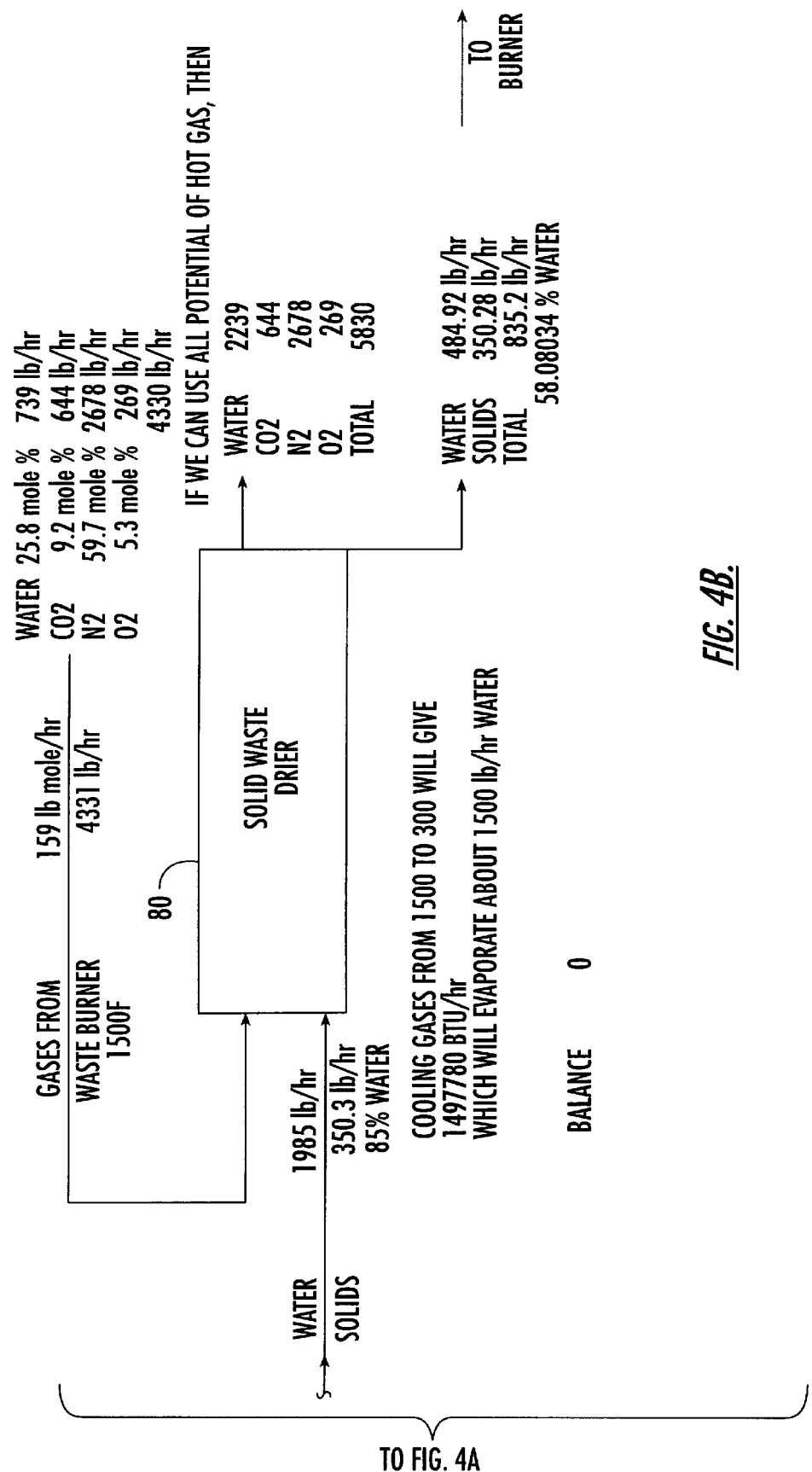

FIG. 4 shows a representative mass balance analysis for the system described above as used in association with a 10,000 hog farm. FIG. 4 details the wastewater treatment plant processes from the waste slurry input to the resulting outputs, namely, clean flushwater and clean stack gases.

The daily production of wastewater is approximately 10 gallons per hog, consisting of 1 gal (urine+manure liquid)+1 gal leaked drinking water+8 gal flushwater. A 10,000 hog farm having an excess capacity factor of 20% would therefore have to process 120,000 gallons of waste liquids per day. Of all wastewater entering the lagoon, waste solids comprise 1% of the total. 120,000 gallons/day of waste slurry translates to 417 lbs/hr of "bone dry solids" in the presence of 41283 lbs/hr of water.

The treatment plant's waste separation drum performs a primary filtering of the waste stream, capturing at least 60% of the input, or 250.2 lb/hr of bone dry solids in the presence of 1417.8 lb/hr of bound water, while the free liquids drain into the settling tank. Of the 166.8 lb/hr of "bone dry solids" which escape to the settling tank, at least 60%, or 100.08 lb/hr will settle out within one hour and be recovered.

Continuous cleaning of the separator screen is achieved by directing streams of compressed air at the rotating drum. As the flow of cleaning air passes through the drum, it combines with odorous gases emitted from the wastes within. The combined gases are then exhausted to the combustor.

Solids captured by the separation drum plus the solids recovered from the settling tank, amounting to 350.3 lb/hr of bone dry solids in 1985 lb/hr of water, is applied to the dryer drum. In the dryer, flue gases at 1500 degrees F. mix directly with wet solids, thereby vaporizing about 1500 lb/hr of water. At this point, as the solids head toward the combustor, the moisture content is approximately 58%. If desired, the moisture may be further reduced by increased residence time of the solids within the dryer.

39,298 lb/hr of liquid waste leaves the settling tank carrying 66.72 lb/hr of bone dry solid waste. The liquid is then ozonated at deodorizer 94 (optionally preceded by a secondary filtration process) before going to flushwater reservoir 50.

Flue gases at 1500 degrees F. are applied to dryer 80 for dewatering the manure. Included in the gas stream is 739 lb/hr of water vapor. As the waste is heated, 1500 lb/hr of moisture is evaporated, resulting in an exiting gas stream which contains 2239 lb/hr of water. Waste fumes also add to the gas stream as the wet manure is heated. The water vapor is removed at gas condenser 100, enabling the waste fumes to be burned.

Flushwater Alternatives

Ideally, flushwater reservoir 50 should contain enough water to withstand the longest possible plant shutdown and raw waste holding tank 38 should have the same capacity. In a prolonged shutdown insufficient reserves could result in total loss of flushwater, which would be an unacceptable situation. Three alternatives are considered:

1. Provide emergency repair services capable of restoring operation within a limited time period, regardless of the problem. But this implies that replacement parts will always be available, that there would be no catastrophic plant failures, no labor stoppages, etc.
2. Provide sufficient flushwater reserves and waste holding capacity for the longest imaginable problem. But a leakproof reservoir and wastewater holding tank of such great capacity would be very expensive, and are not even likely to be used.
3. A simple, low cost solution is provided in accordance with the invention. Reservoir capacity for a five day supply of clean flushwater is provided which is adequate time for most repairs. If the five day reserves are depleted, flushwater will be drawn from an alternative source, raw waste holding tank 38, through a manual, emergency enabled flushwater sourcing valve 99. Thus, under temporary emergency circumstances, it is acceptable to utilize the raw waste holding tank as though it were a small lagoon. Note that the waste holding tank would be full when the reservoir is empty. As with a lagoon, flushwater would be drawn from a position some distance from where the wastewater is deposited.

If sufficient capacity at reservoir 50 is provided to withstand a five day shutdown, then emergency situations requiring recirculation of unprocessed wastewater will be extremely rare. Odors generated during the first weeks of shutdown are not produced by anaerobic decomposition, therefore, they are not very objectionable. Also, it is unlikely that more than one farm would be down in any one area, therefore, the overall effect as seen by farm neighbors should be acceptable.

Excess Plant Capacity

Waste that has accumulated in raw waste holding tank 38 during a plant shutdown should be processed promptly upon resumption of operation. The plant's processing and evaporation capability therefore is set at least 20% higher than the daily waste production rate. When the excess capacity is not required for reduction of the waste tank backlog, it may be used in a retrofit installation for draining the discontinued lagoon.

Reservoir Capacity

As discussed, flushwater reservoir 50 should hold a sufficient supply of clean flushwater to withstand a plant shutdown of several days. The reservoir must also store excess flushwater which has not yet been evaporated. Capacity for one month of non-evaporation may be provided.

In a preferred embodiment for use with a 10,000 hog farm, the total reservoir capacity is determined as follows: 5 days×(10,000 hogs×8 gals of flushwater/hog/day×120% capacity factor)+30 days×(10,000 hogs×2 gals of freshwater/hog/day×120% capacity factor)=1.1 million gallons. At 327,375 gal/acre-ft, a capacity of 3.3 acre-feet is required. This is implemented with a 12 foot deep pond having an area of 0.28 acres.

Waste Holding Tank Capacity

Capacity of wastewater holding tank 38 is simply: 5 days×(10,000 hogs×10 gals of wastewater/hog/day×120%)= 600,000 gallons, or 1.83 acre-feet. This is implemented with a 12 foot deep pond having an area of 0.15 acres.

Smart Evaporator

According to prior art practices (FIG. 1), eighty to ninety percent of the wastewater flushed from the growing buildings consists of flushwater drawn from the lagoon. This flushwater may be regarded as a constant recirculating volume, distinct from all that it flushes from the buildings. The remaining ten to twenty percent of the wastewater consists of urine, derived primarily from drinking water, leaked drinking water, and to a much lesser extent, the fresh water used in washing the pens as hog groups are moved. Manure solids comprise approximately one percent of the total.

The lagoon level increases primarily due to all fresh water usages. Net precipitation, i.e., rainfall less evaporation, is the second major factor in filling a lagoon. Just as a lagoon fills due to accumulated waste and rainfall, the clean flushwater reservoir would also fill.

To keep reservoir 50 from overflowing, it is preferable to have a means provided to counter the water accumulation. Although the flushwater produced by treatment plant 34 is far cleaner than the wastewater it came from, it still may not be discharged directly to the environment. Evaporation, however, is a completely appropriate process for discharging excess flushwater. To this end, a solar "smart" evaporator 55 (FIG. 9) is provided which is enabled at all times except during rainfall. The system controller 130 (FIG. 8) enables pump P to transfer clean flushwater from reservoir 50 to the evaporator basin 130 and maintains it at a constant level as evaporation proceeds.

Operation of evaporator 55 is as follows: When rain is detected, a flushwater return drain gate 132 opens, allowing the evaporator basin contents to drain back into flushwater reservoir 50 via conduit 133. Thus, rainfall cannot cause basin 130 to overflow with a resultant release of flushwater to the surroundings. Drain gate 132 remains open until a predetermined amount of rain has fallen to wash the contents of evaporator basin 130 back into reservoir 50. As flushwater drain gate 132 closes, a rainwater discard gate 136 opens. The rainwater discard gate 136 allows all subsequent rainfall on the evaporator to be discarded to the ground. Both drain gate 132 and rainwater discard gate 136 are electrically operated by the system controller 130. If electricity is lost during a storm, the gates will default to a safe state whereby the evaporator sheds its contents into the flushwater reservoir, not to the environment.

Available evaporation data for North Carolina's coastal plain hog growing region shows the average evaporation rate during the eight warmer months, March 1–November 1, to be 6.1 inches per month. Note that the flushwater reservoir is designed to have a capacity to allow for a non-evaporation period of up to thirty days permitting use of average evaporation rates in calculating the evaporator area. Data available for the four colder months indicates an evaporation rate of approximately 2.5 inches per month. It should be noted that the animal's water usage during cold weather is significantly lower than in the warmer weather.

Evaporation produced by a five acre solar pond, plus the averaging effect produced by the excess reservoir capacity, allows the evaporation system to keep pace with the total liquid waste production throughout the year. The solar evaporation requirements for a typical 10,000 hog farm are set forth in Table I, below:

TABLE I

Evaporation: Nov–Feb

| Excess waste/day | = urine + leakage | = 14,000 gal/day |
|---|---|---|
| Average Evap | = 2.5 inch/month | = .007 ft/day (Note 1) |
| Evap Vol/acre | | = 2,275 gal/day (Note 2) |
| 5 Acre Evap Vol | | = 11,375 gal/day (Note 3) |

Evaporation: Mar–Oct

| Excess waste/day | = urine + leakage | = 20,000 gal/day |
|---|---|---|
| Average Evap | = 6.1 inch/month | = .017 ft/day |
| Evap Vol/acre | | = 5,550 gal/day |
| 5 Acre Evap Vol | | = 27,900 gal/day |

Note 1:
Solar evap rates for Eastern N. Carolina - (based on 1995, 1996 data)
Note 2:
43,000 sq-ft/acre; 7.5 gal/cu-ft
Note 3:
Nov–Feb: The amount by which wastewater exceeds evaporation capability will be accumulated in the flushwater reservoir, and will be evaporated in Mar–Oct.

In a retrofit situation, it may become necessary to drain a discontinued lagoon. One or two acres would then be added to the solar pond area depending on whether the lagoon level is just to be maintained or if it must be lowered.

The bottom of the evaporation pond should be graded to a smooth taper, thereby permitting rapid drainage without puddling. It is desirable to hold the average pond depth as small as practical, in order to minimize the energy required to fill the pond and to maximize the aeration effect on liquids flowing through the pond. Plastic sheeting, similar to that recommended for liners in new lagoon construction, preferably covers the bottom of the pond. The sheeting prevents sand or clay from the pond's bottom being flushed into the reservoir every time the evaporator is drained. Precision grading with laser-equipped motor graders can achieve an evaporator bottom which is level to within 0.1 feet. This capability enables an evaporator having a bottom taper of 4 inches or less.

Figure 10A:
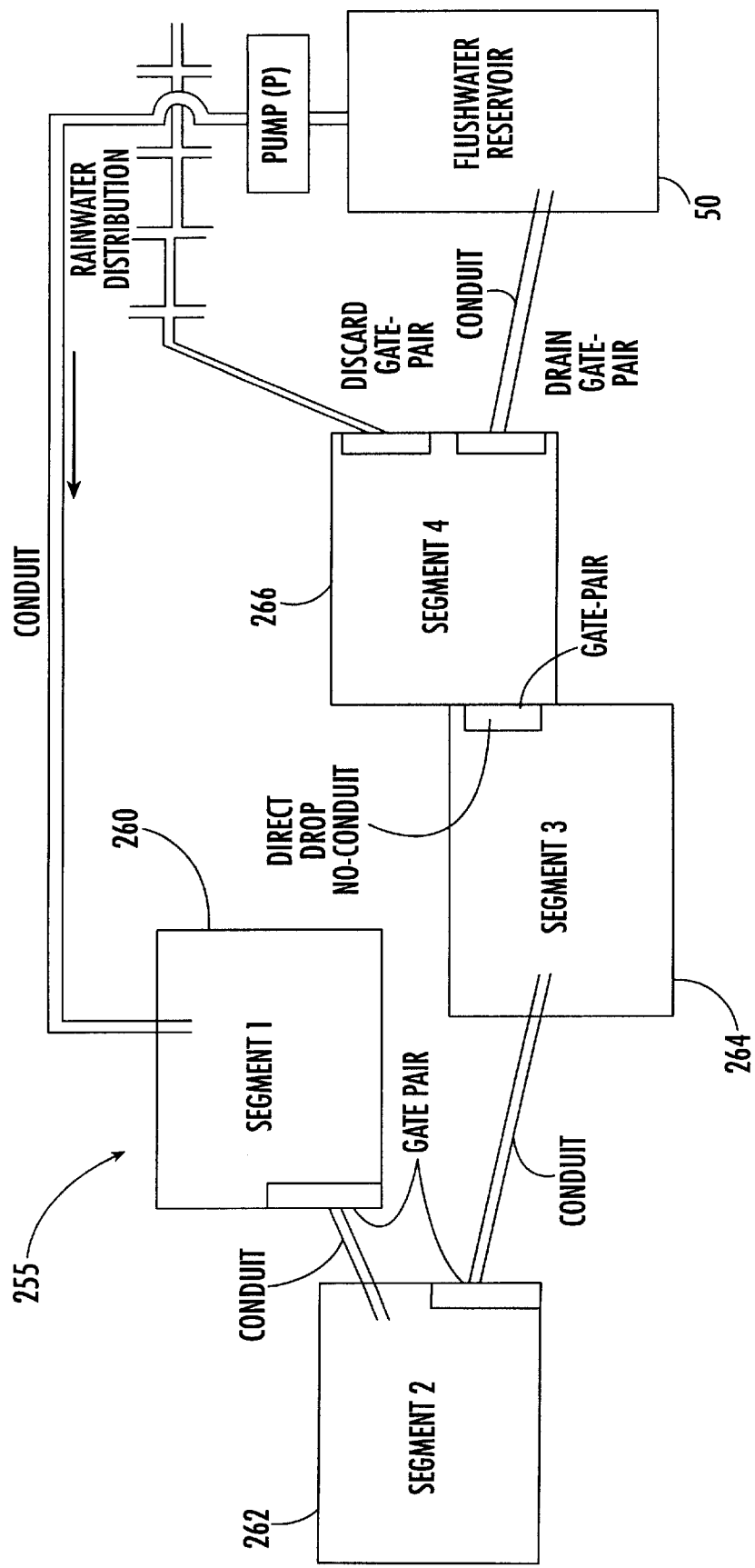

As set forth in Table I, a 10,000 hog farm requires a five acre evaporator. The cost of clearing and grading an area of this size, if free of boulders, brush and trees, is quite moderate and in keeping with other project expenses. A smooth six inch basin taper gives an average evaporator depth of just three inches, minimizing the volume of water required for filling, thereby keeping pumping costs low. This taper provides good drainage with minimum residual puddling. However, it may be unreasonable to expect all farms to have unutilized five acre parcels flat enough to satisfy these requirements. Thus, an alternative smart evaporator 255 (FIGS. 10A and 10B) allows for non-contiguous terraced basin segments which may be placed wherever open space permits. Each of the individual segments has a six inch taper; thus, the average depth of the aggregate five acre evaporator is only three inches. A terraced arrangement also keeps construction costs down by minimizing the amount of earth movement required.

Each basin segment 260, 262, 264, 266 has a drain gate-pair for transfer of its contents to the next segment or, in the case of the last segment 266, to reservoir 50. The last segment 266 also has an additional discard providing the capability of directing its contents to reservoir 50 or to the environment. Except for the environment discard at segment 266, all gates preferably are six inches high when fully closed, which is the depth of the tapered basin at that point. Thus, the segments cannot overfill, as the gate spillover design limits the amount of water in each segment. The environment discard at segment 266 is slightly higher to prevent unintended spillover.

When filling evaporator 255, flushwater is pumped by pump P to the highest segment 260. Then, depending on layout, water from the highest segment falls directly into the next lower segment, or reaches it via conduit. This cascade continues down to the lowest segment 266, where the excess water spills over the six inch evaporator drain gate, thus ending its circuit in reservoir 50 where it began. Evaporator segments may be distributed over great distances and elevations to take best advantage of the farm topography.

Figure 5:
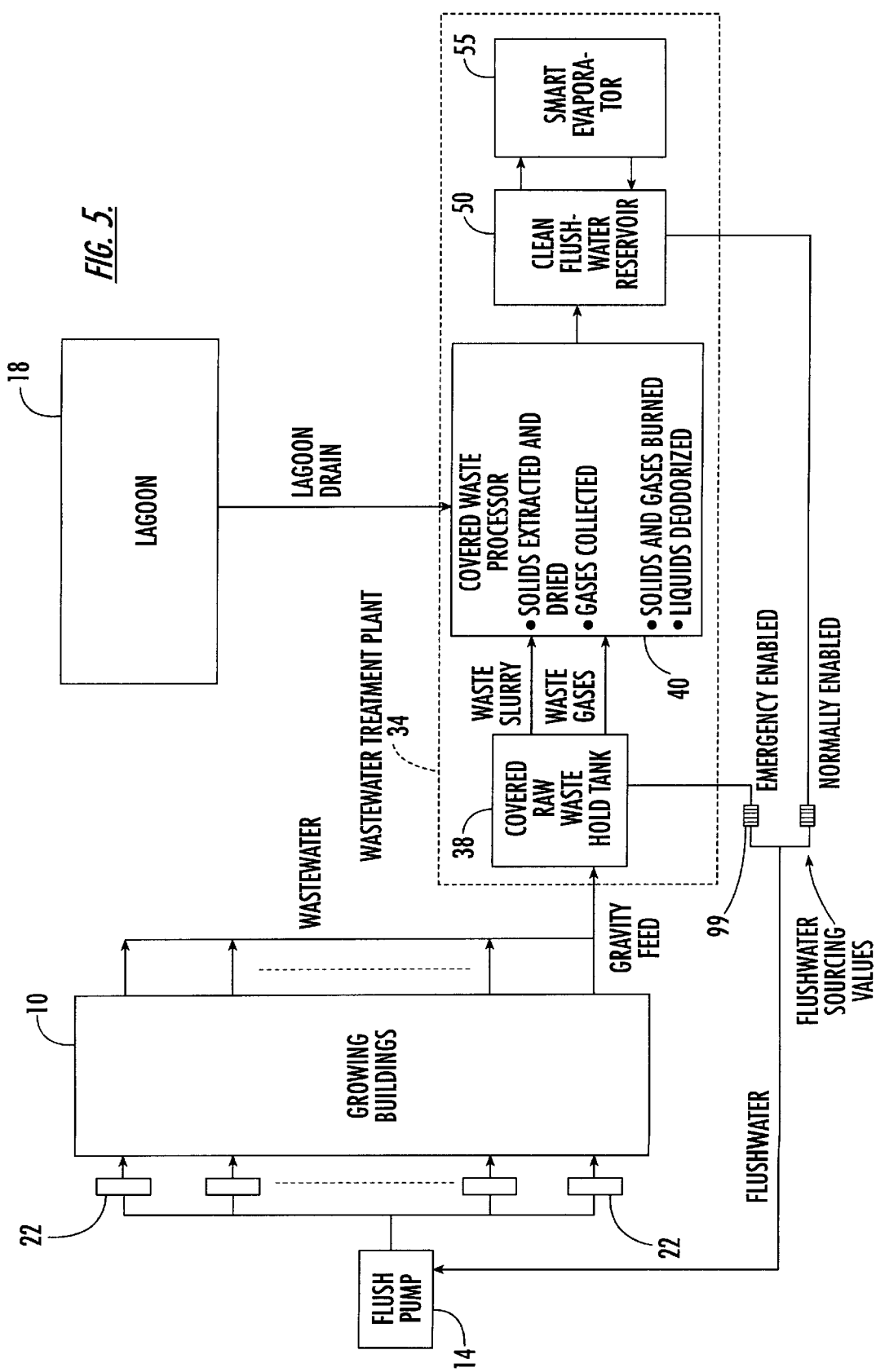
FIG. 5 is similar to FIG. 2, but showing an alternative embodiment of the wastewater treatment plant of the present invention that is installed as a retrofit to an existing farm.

Draining the Existing Lagoon in a Retrofit Installation (FIG. 5)

When a wastewater treatment plant of the invention replaces the function of a lagoon and spreading fields, the old lagoon should not be completely abandoned. Though wastewater no longer flows to it, the lagoon will continue to accumulate precipitation, leading to eventual overflow. Also, many existing lagoons are leaking and will continue to do so even after the wastewater treatment plant of this invention has rendered it useless. Whether or not an abandoned lagoon is known to be leaking, a plan should be undertaken to reduce its leakage potential. Reducing the water level results in a corresponding reduction in the forces which drive the lagoon's leakage, thereby reducing the lagoon's leakage rate.

With no additional waste going to the abandoned lagoon, continuation of the usual program of field spraying may be used to lower the water level by two thirds within eighteen months after installation of the wastewater treatment plant. Thereafter, field spraying is discontinued and the plant's excess capacity is utilized to slowly drain the remaining lagoon water.

System Controller

Figure 8B:
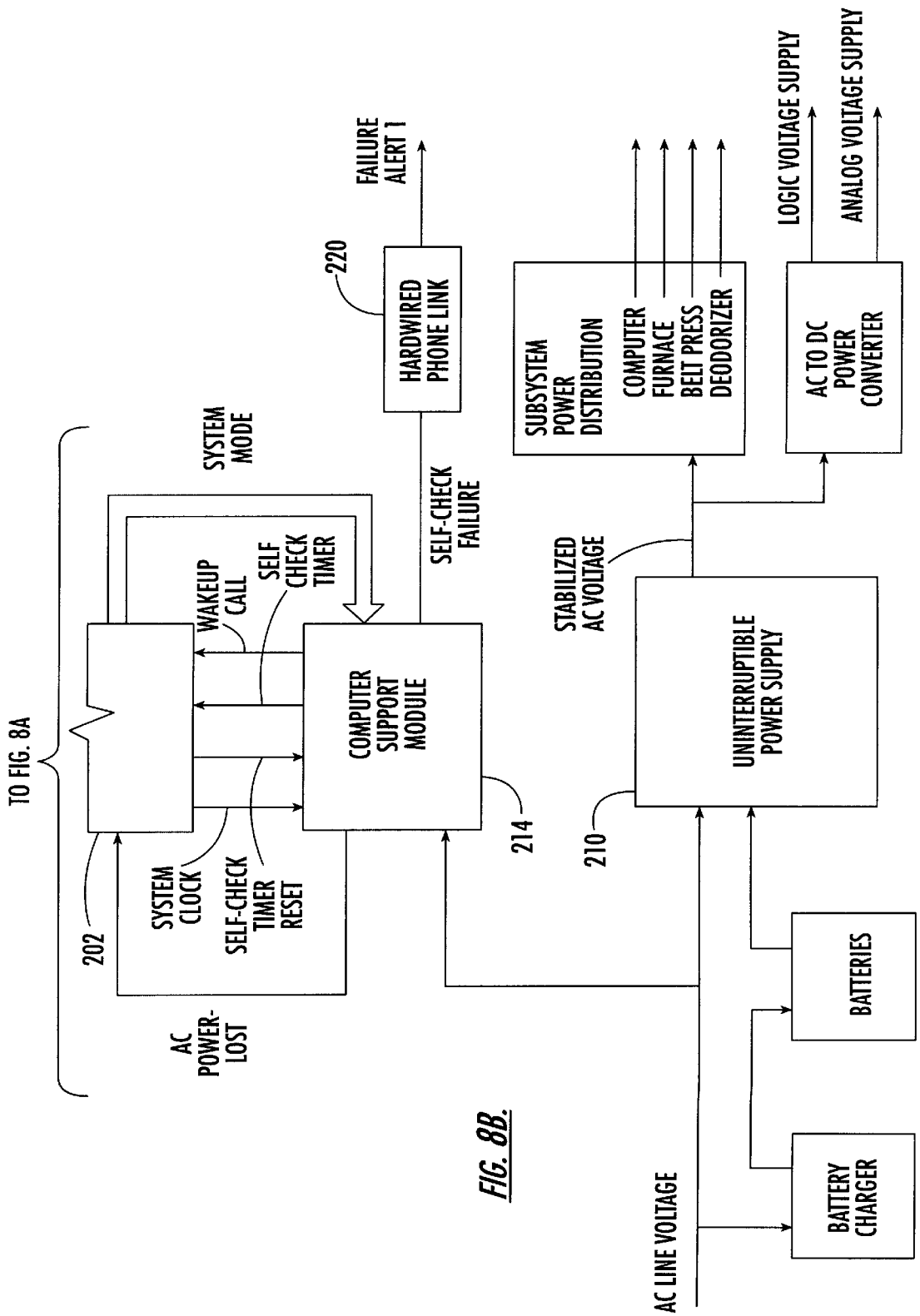
FIG. 8 is a view of the system controller.
Figure 9:
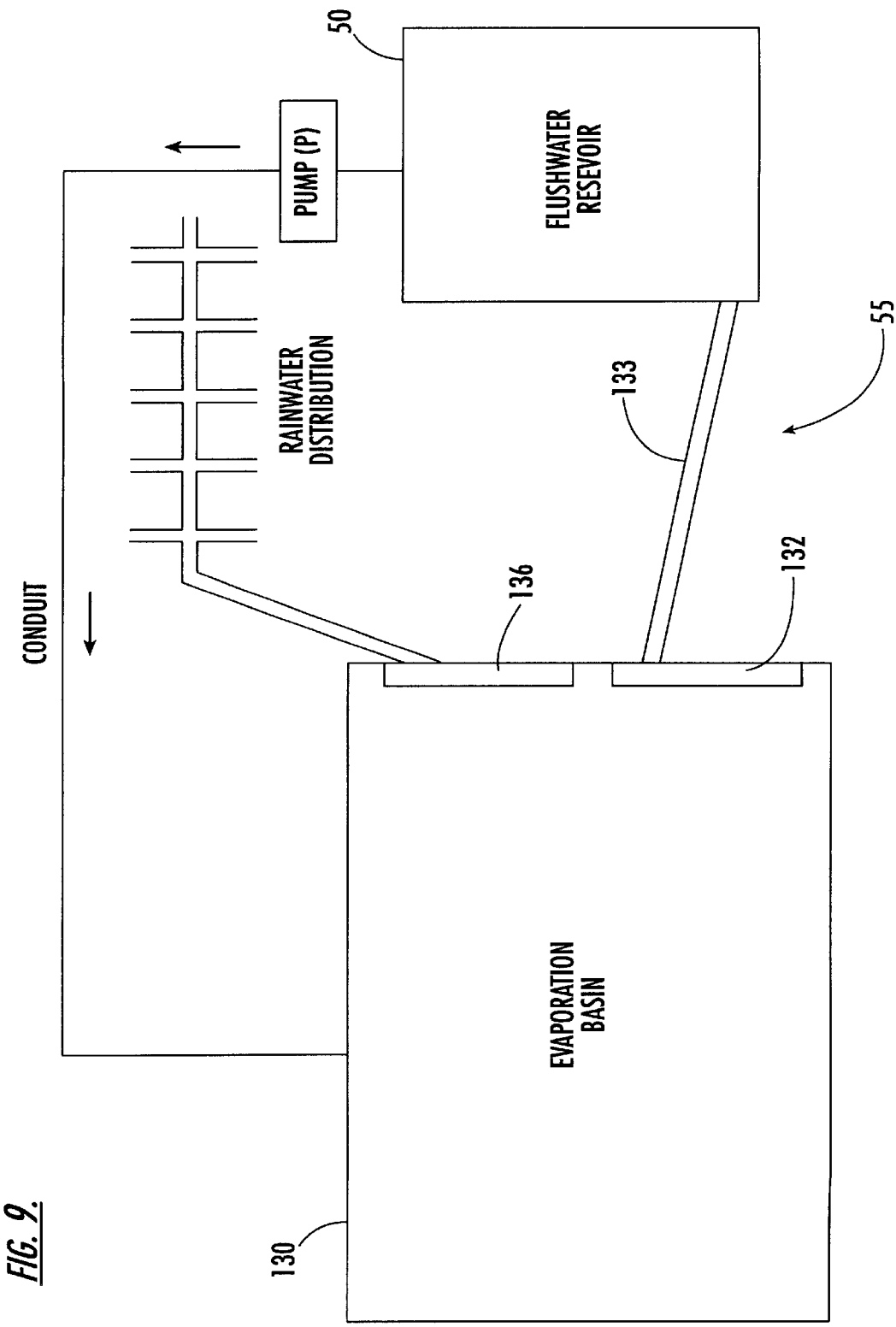
FIG. 9 is a view of one embodiment of the smart solar evaporator.

The system controller 200 shown in FIG. 8 is programmed for unattended monitoring and control of all key wastewater treatment plant parameters, including: reservoir and waste hold levels, plenum and flue gas flow rates, combustor temperature, condenser temperature, ozone generation level, rainfall rate, evaporator pumping rate, evaporator gate position sensors, battery voltage level, power supply voltages and motor currents. All signals derived from analog sensors are multiplexed to the analog to digital controller 201 which presents them in digital form to the computer 202. The system controller enables components and subsystems via a bank 206 of solid state AC switches.

Operation of the wastewater treatment plant must be in regulatory compliance at all times, including emergency conditions. To maximize reliability the system should self-test frequently and monitor key operating parameters constantly. Out of range conditions which cannot be corrected automatically will cause the system controller to send an emergency service alert. Then, the entire system will go off-line, in effect defaulting to a passive state. Ability of the central service group to call up a real-time graphic display of system status and measurements will greatly assist in problem determination. Faster and more precise problem resolutions may be obtained by adding remote system control capabilities to the central service diagnostic routines. Reservoir 50 will normally hold five days of clean flushwater. If a prolonged maintenance shut-down occurs, the central service organization must watch for low reservoir conditions, then manually shut the reservoir flushwater valve and open the waste hold flushwater valve. Drawing flushwater from the waste holding tank is equivalent to drawing from a lagoon.

All system power is provided by an uninterruptible power supply 210 which normally filters line disturbances and regulates the AC voltage. During periods of AC line voltage drop-out, however, the uninterruptible power supply transforms backup battery DC power to full amplitude 60 Hz AC power, thereby enabling the system to continue operating. An uninterruptible power supply deemed suitable for this application is the model Smart-UPS T Series, manufactured by American Power Conversion, Inc. of West Kingston, R.I. The line voltage drop-out is detected by a circuit on the computer support module 214 which then transmits that information to computer 202. As most power outages are of very short duration, the computer takes no action for the first 60 seconds. Standby mode is enabled after 60 seconds, causing the evaporator pump, deodorizer and condenser pump to be halted. The combustor is set to auto-shutdown mode. The waste hold pump, separator and dryer are purged, washed and shut down. Except for the computer support module, all component power may be shut down. Minimizing power consumption in standby mode is essential; therefore, the computer and all circuits are quiesced as much as possible. Only the computer support module remains energized. A timer circuit on the support module issues periodic wake up calls to the computer when its services are required.

The computer self-tests periodically in conjunction with the computer support module. When the test result is correct, the computer resets a timer circuit on the support module. If the test result is incorrect, the computer is unable to reset the support module timer. When the timer times out, the computer support circuit uses the dedicated telephone connection 220 to issue an automatic service alert. When functionality of the system controller is in question, the smart evaporator 55 will be automatically commanded to drain. Likewise, when the system controller determines that backup battery voltage is becoming marginal, it drains the evaporator.

When the evaporator's drain gate is raised, the evaporator contents are drained into reservoir 50. Similarly, raising the discard gate causes the evaporator contents to be discarded to the environment. It is essential that these gates function properly. A process of pro-actively testing the gates at least once a day greatly reduces the possibility of failure under adverse conditions. Raising and lowering an evaporator gate would verify that its electrical and mechanical components are functioning properly; however, this action would release large volumes of water. While draining evaporator water to the reservoir is of no great concern, unintended discharge of evaporator contents to the environment is absolutely prohibited. To accommodate the test requirement while minimizing test discharges, a pair of independently actuated gates are utilized for both drain and discard functions.

Each gate of the pair is equipped with up-limit and down-limit travel sensors. A test starts by observing that the down-limit sensors of the primary and secondary gates are active. The primary gate actuator is then commanded to open, which should result in a response from the primary gate up-limit sensor. The water released by opening the primary gate is stopped by the secondary gate. Actuating a command to lower the primary gate should yield a response from its down-limit travel sensor. The secondary gate is then raised and lowered, producing the corresponding travel sensor signals. Water trapped between the primary and secondary gates would be released; however, by placing the gates very close to each other the test discharge could be kept to an absolute minimum. For example, an evaporator depth of 6 inches, a gate width of 6 inches, and a gate-to-gate spacing of 6 inches would produce a test discharge of less than 1 gallon.

Every refill of the evaporator adds about one and one half cents to the market price of each hog; therefore, it would be undesirable to overreact to brief showers. The system controller uses a precision rain gauge to calculate rate and duration of rainfall against preset qualifiers; thus, trading off small rain accumulations against emptying the evaporator too frequently. Similarly, rain gauge data enables the controller to determine when sufficient rain has fallen on the empty evaporator basin to ensure that it has been adequately washed. At that point, the evaporator gates are set to discard subsequent rainfall. A precision rainfall detector deemed suitable for this application is contained in model 970 Ultrasonic Flow & Water Quality Meter, manufactured by American Sigma Inc. of Medina, N.Y.

Alternative Embodiment (Belt-Press Separator)

In an alternative embodiment, separator 58 may take the form of a self-feeding, self-cleaning, belt-press filtering system (not shown). Such a system is exemplified by model 0.7-Meter Tower Press, manufactured by Roediger Pittsburgh, Inc. of Allison Park, Pa., which is capable of extracting a 30% concentration of hog manure from a mixed slurry having a 1% solids concentration. Utilizing a combination of polymer flocculants and fine fiber additives, the manure particles are conjoined into a cohesive wet layer which may be pressed without blinding the filter. (Blinding occurs when a mesh becomes irreversibly clogged by the substance it is attempting to filter.) Combustion of a 30% concentration hog manure cake will yield 2100 BTUs of flue gas energy per pound. Combustor 120 requires an approximately 50% concentration of manure solids to achieve self-sustained combustion. Therefore, the filter cake preferably is dewatered in dryer 80 from 30% to 50% concentration, requiring removal of 0.4 pounds of water. As only 400 BTUs are required for this dewatering and the available flue gas energy is 2100 BTUs, this is well within the capability of dryer 80 of FIG. 3.

While the invention has been described in connection with certain illustrated embodiments, it will be appreciated that modifications may be made without departing from the true spirit and scope of the invention.

What is claimed is:

1. A method of processing animal wastes produced in a confined animal growing area, said method comprising:

separating an animal waste stream into a first component consisting essentially of wet waste solids and a second component consisting essentially of liquids;

dewatering the first component to form dewatered waste solids;

burning the dewatered waste solids;

evaporating at least a portion of the second component in an in-ground solar evaporator basin; and draining liquid from the in-ground solar evaporator basin to a reservoir during periods of rain to limit the amount of rainwater that mixes with the second component.

2. A method according to claim 1 including the step of storing the second component in a reservoir before the step of evaporating.

3. A method according to claim 1 including the step of returning at least a portion of the same liquid to the in-ground solar evaporator basin after the rain has stopped, wherein the returning step occurs after the draining step.

4. The method of claim 1 further comprising the step of filling the in-ground solar evaporator basin with at least a portion of the second component before evaporating at least a portion of the second component.

5. A method of processing animal wastes produced in a confined animal growing area, said method comprising:

separating an animal waste stream into a first component consisting essentially of liquids and a second component consisting essentially of waste solids having a water content;

transferring at least a portion of the first component to an in-ground solar evaporator basin such that the first component forms an air-liquid interface having a first surface area;

evaporating at least a portion of the contents of the in-ground solar evaporator basin;

draining the contents of the in-ground solar evaporator basin to a reservoir such that the contents of the reservoir form an air-liquid interface having a second surface area smaller than the first surface area; and refilling the in-ground solar evaporator basin using the contents of the reservoir.

6. The method of claim 5 further comprising the step of storing the first component in the reservoir after the separating step and before the transferring step.

7. The method of claim 5 wherein the draining step comprises draining the contents of the in-ground solar evaporator basin to the reservoir such that a portion of the contents remains as a waste film on surfaces of the evaporator basin.

8. The method of claim 7 wherein the draining step is performed during periods of rain.

9. The method of claim 8 further comprising the step of receiving falling rain in the in-ground solar evaporator basin after the draining step and before the refilling step.

10. The method of claim 9 further comprising the step of diverting the received rain from the in-ground solar evaporator basin to the reservoir.

11. The method of claim 10 further comprising the step of determining that the waste film has been sufficiently removed such that further rain received in the in-round solar evaporator basin will not harm a surrounding environment external to the in-ground solar evaporator basin and the reservoir.

12. The method of claim 11 further comprising the step of discarding the further received rain from the in-ground solar evaporator basin to the surrounding environment after the determining step.

13. The method of claim 12 wherein the refilling step occurs after the rain has stopped.

14. The method of claim 5 wherein the draining step is performed during periods of rain.

15. The method of claim 5 further comprising the step of maintaining a predetermined liquid level in the in-ground solar evaporator basin as the contents of the basin evaporate.

16. The method of claim 5 further comprising the step of filling the in-ground solar evaporator basin with at least a portion of the second component before evaporating at least a portion of the second component.

17. The method of claim 5 further comprising the step of limiting an amount of the first component discharged from the in-ground solar evaporator basin to a surrounding environment external to the in-ground solar evaporator basin and the reservoir when a gate configured to discard liquid from the in-ground evaporator basin to the surround environment is tested.

18. A method of processing animal wastes produced in a confined animal growing area, said method comprising:

separating an animal waste stream into a first component consisting essentially of liquids and a second component consisting essentially of waste solids having a water content;

transferring at least a portion of the first component to an evaporator basin such that the first component forms an air-liquid interface having a first surface area;

evaporating at least a portion of the contents of the evaporator basin;

maintaining a predetermined liquid level in the evaporator basin as the contents of the basin evaporate;

draining the contents of the evaporator basin to a reservoir such that the contents of the reservoir form an air-liquid interface having a second surface area smaller than the first surface area; and refilling the evaporator basin using the contents of the reservoir.

19. The method of claim 18 wherein the predetermined liquid level maintained is a constant level.

20. The method of claim 18 wherein the maintaining step comprises:

determining a decrease in the liquid level; and transferring liquid from the reservoir to the in-ground solar evaporator basin until the predetermined liquid level in the in-ground solar evaporator basin is reached.

* * * * *